(12) United States Patent
Gaunzon et al.

(10) Patent No.: US 6,533,340 B1
(45) Date of Patent: Mar. 18, 2003

(54) COMBINATION GROCERY HOOK AND CARGO LID HOOK STORAGE DEVICE

(75) Inventors: Ruben Gaunzon, Powell, OH (US); Toshikazu Hirose, Dublin, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/035,943

(22) Filed: Dec. 26, 2001

(51) Int. Cl.[7] ................................................. B60R 7/04
(52) U.S. Cl. .................. 296/37.16; 296/37.8; 296/37.5; 296/37.1; 224/584; 224/268; 224/269; 224/400; 224/925
(58) Field of Search ........................... 296/37.16, 37.14, 296/37.8, 37.5, 37.1; 224/584, 268, 269, 271, 400, 925; 410/101, 106

(56) References Cited

U.S. PATENT DOCUMENTS

| | | | | |
|---|---|---|---|---|
| 4,540,213 A | * | 9/1985 | Herlitz et al. ............. | 296/37.16 |
| 5,121,958 A | * | 6/1992 | Goeden et al. ........... | 296/37.16 |
| 5,484,091 A | * | 1/1996 | Malinowski et al. ....... | 224/542 |
| 5,492,257 A | * | 2/1996 | Demick .................... | 296/37.16 |
| 6,014,833 A | * | 1/2000 | Benavidez ............. | 206/315.11 |
| 6,062,452 A | * | 5/2000 | Kauskey ..................... | 296/37.1 |
| 6,149,040 A | * | 11/2000 | Walker ....................... | 296/37.1 |
| 6,267,442 B1 | * | 7/2001 | Shiino et al. ............... | 297/254 |
| 6,276,583 B1 | * | 8/2001 | Tourneur .................... | 224/542 |

\* cited by examiner

Primary Examiner—D. Glenn Dayoan
Assistant Examiner—Lori L Coletta
(74) Attorney, Agent, or Firm—Rankin, Hill, Porter & Clark LLP

(57) ABSTRACT

A cargo lid retention device and method for holding a cargo lid in an open position, wherein the retention device includes a fixed hook member, a removable hook member, and a tether. The fixed hook member defines a receptacle that releasably receives the fixed hook member. The receptacle includes an upstanding rim and a resilient fastener which cooperate to hold the removable hook member against undesired movement. The removable hook member is secured to the tether which, in turn, is secured to the cargo lid. The tether cooperates with the removable hook member when the removable hook member is secured to a remote support to maintain the cargo lid in the open position.

18 Claims, 3 Drawing Sheets

COMBINATION GROCERY HOOK AND CARGO LID HOOK STORAGE DEVICE

BACKGROUND OF THE INVENTION

It is a constant concern for automobile designers to maximize the storage space for the users of automobiles. It is also increasingly desirable to install accessory devices that permit the user to easily store and access cargo.

In automobiles it is, in general, known to provide a recessed well that is covered by a closure. Typically, such closures are used to conceal spare tires and intermittently used accessory devices. As such, the closures are normally closed during operation of the automobile.

However, in sport utility vehicles, vans and minivans, there is an opportunity to provide a storage space behind the third-row seating. Such a storage space will necessarily be shallow and small in front-to-back dimensions, and not overly useful for storage of large items. However, such a space may be useful for storage of small articles and optionally used items. A cover for such a small storage space will normally be closed and will not permit access to the storage space.

Therefore, there exists a need in the art for a method and device to gain and maintain access to a small storage space in such vehicles. There further exists a need in the art for a method and device to maintain the closure of a small storage spaced in an open position during operation of the vehicle to maximize the available storage space in such vehicles.

SUMMARY OF THE INVENTION

The present invention is generally directed toward a method and device to gain and maintain access to a small storage space in such vehicles. More specifically, the present invention is directed toward a method and device to maintain a cargo lid in an open position during operation of the vehicle to maximize the available storage space in such vehicles.

In accordance with the present invention, a cargo lid has a lower surface and an upper surface, the lower surface having a retention device secured thereto. The retention device includes a fixed hook member, a removable hook member, and a tether.

In further accordance with the present invention, the lower surface of the cargo lid defines a recess in which the fixed hook member is received. The recess includes an upper portion extending from an edge of the lower surface and an enlarged lower portion. The fixed hook member includes an upper hook portion and a lower body member. The lower body member is received within the enlarged lower portion of the cargo lid recess.

In further accordance with the present invention, the lower body member defines a receptacle that is adapted to releasably receive the removable hook member. The receptacle includes an upstanding rim that surrounds a resilient fastener. The removable hook member is releasably received by the fastener and surrounded by the upstanding rim such that the removable hook member is retained against movement in at least two directions.

In further accordance with the present invention, the removable hook member includes a first substantially straight portion and a curved second portion. The first portion has a first end defining an opening that the tether is secured to and a second end from which the curved portion integrally extends. The first portion is secured to the fastener at a location intermediate the first and second ends.

In accordance with a method of the present invention, when the removable hook is secured to a remote support, the removable hook and tether cooperate to retain the cargo lid in an open position.

BRIEF DESCRIPTION OF THE DRAWINGS

These and further features of the present invention will be apparent with reference to the following description and drawings, wherein.

DETAILED DESCRIPTION OF THE PREFERRED EMBODIMENTS

Figure 1:
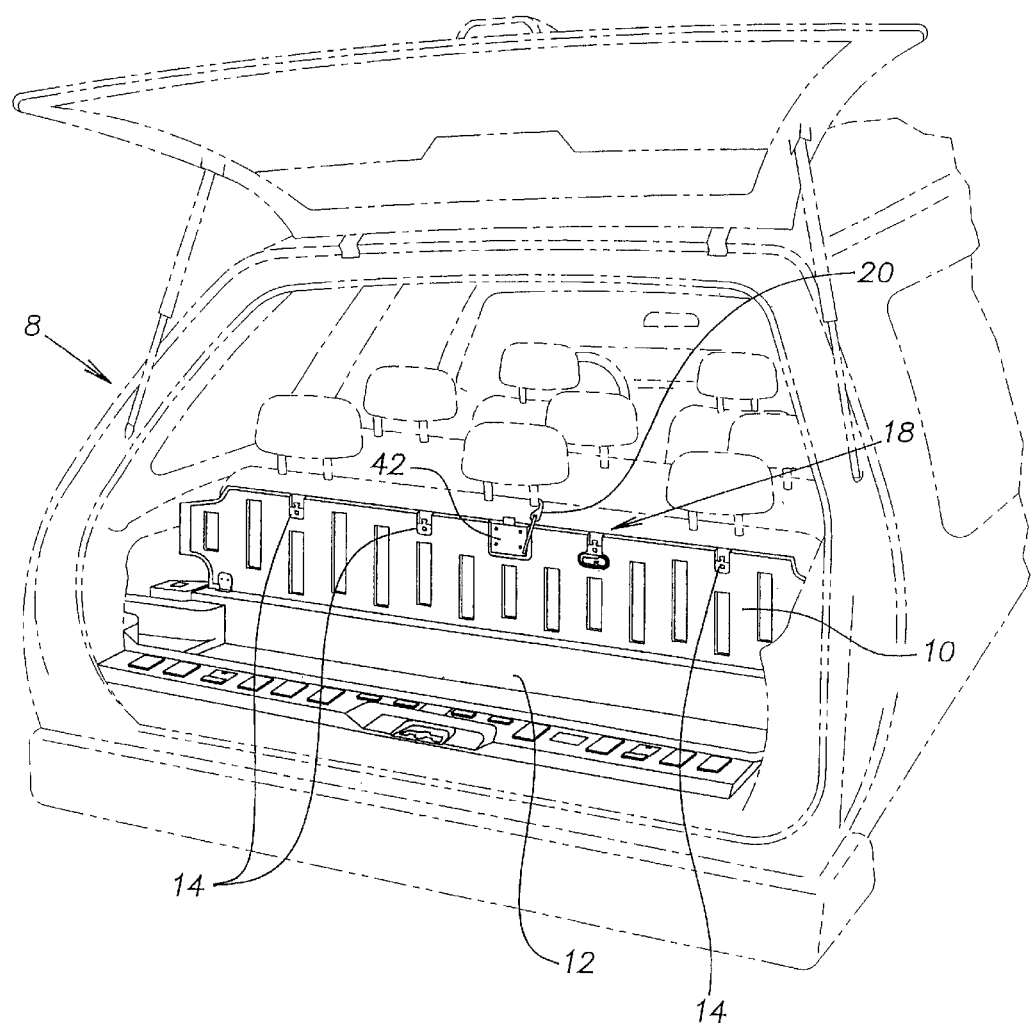
FIG. 1 is schematically illustrates a rear end of a vehicle incorporating the present invention.

With reference to the drawing figures, a storage space at a rear of a vehicle 8 is shown to be associated with a rear cargo lid 10. In FIG. 1, the cargo lid 10 is shown in an open position, it being considered apparent that the cargo lid 10 could be pivoted to a closed position wherein the cargo lid 10 covers the storage space provided by the cargo lining. Preferably, the cargo lid 10 has an upper surface that is substantially flush with the surrounding vehicle floor when the cargo lid 10 is in the closed position. When the cargo lid 10 is in the open position, as depicted in FIG. 1, the upper surface of the cargo lid 10 faces toward the adjacent seat, and generally perpendicular to the vehicle floor. Similarly, when the cargo lid 10 is in the closed position the lower surface of the cargo lid 10 is facing toward the storage space and cooperates with the cargo lining 12 to define an enclosed space. When the cargo lid 10 is in the open position, the lower surface of the cargo lid 10 faces toward the rear of the vehicle and generally perpendicular to the vehicle floor.

The storage space of the cargo lining 12 may be designed to receive small items to permit the cargo lid 10 to remain in the closed position during operation of the vehicle. Additionally, the storage space may be specially designed to receive an optional accessory device, such as a tonneau cover. Insofar as the design of the cargo lining 12 and the use of the storage space, especially its use for receipt of an optional accessory device, is not the subject of the present invention, the configuration and use of such cargo lining 12 and associated storage space will not be described in detail hereinafter.

As shown in FIG. 1, the lower surface of the cargo lid 10 has a plurality of hooks 14 secured thereto. The hooks 14 are designed to receive and support bags, such as plastic grocery bags, therefrom. However, if the cargo lid 10 is maintained in the open position without further support while the vehicle 8 is operated, vibrations normally occurring during driving may cause the cargo lid 10 to move from the open position toward the closed position, possibly damaging the items contained within the suspended bags. As will be described hereinafter, the combination grocery hook and cargo lid hook storage device 16 of the present invention, hereinafter referred to as a retention device 16, is specially adapted to maintain the cargo lid 10 in the open position during use of the vehicle.

Figure 2:
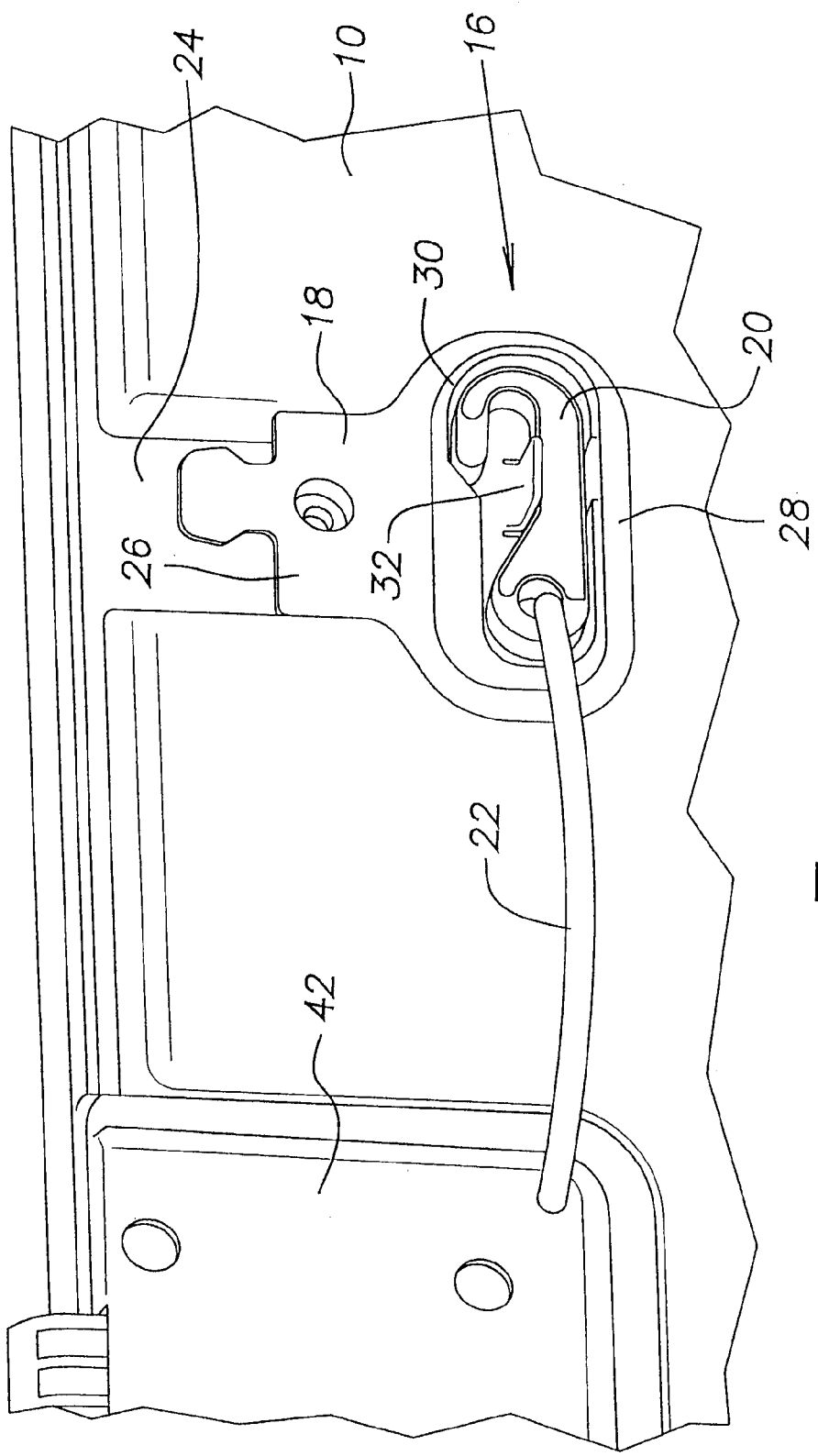
FIG. 2 is an enlarged perspective view of a combination grocery hook and cargo lid hook storage device according to the present invention; and, FIG. 3 is a view similar to FIG. 2, but with a removable hook of the combination grocery hook and cargo lid hook storage device shown in a removed position.
Figure 3:
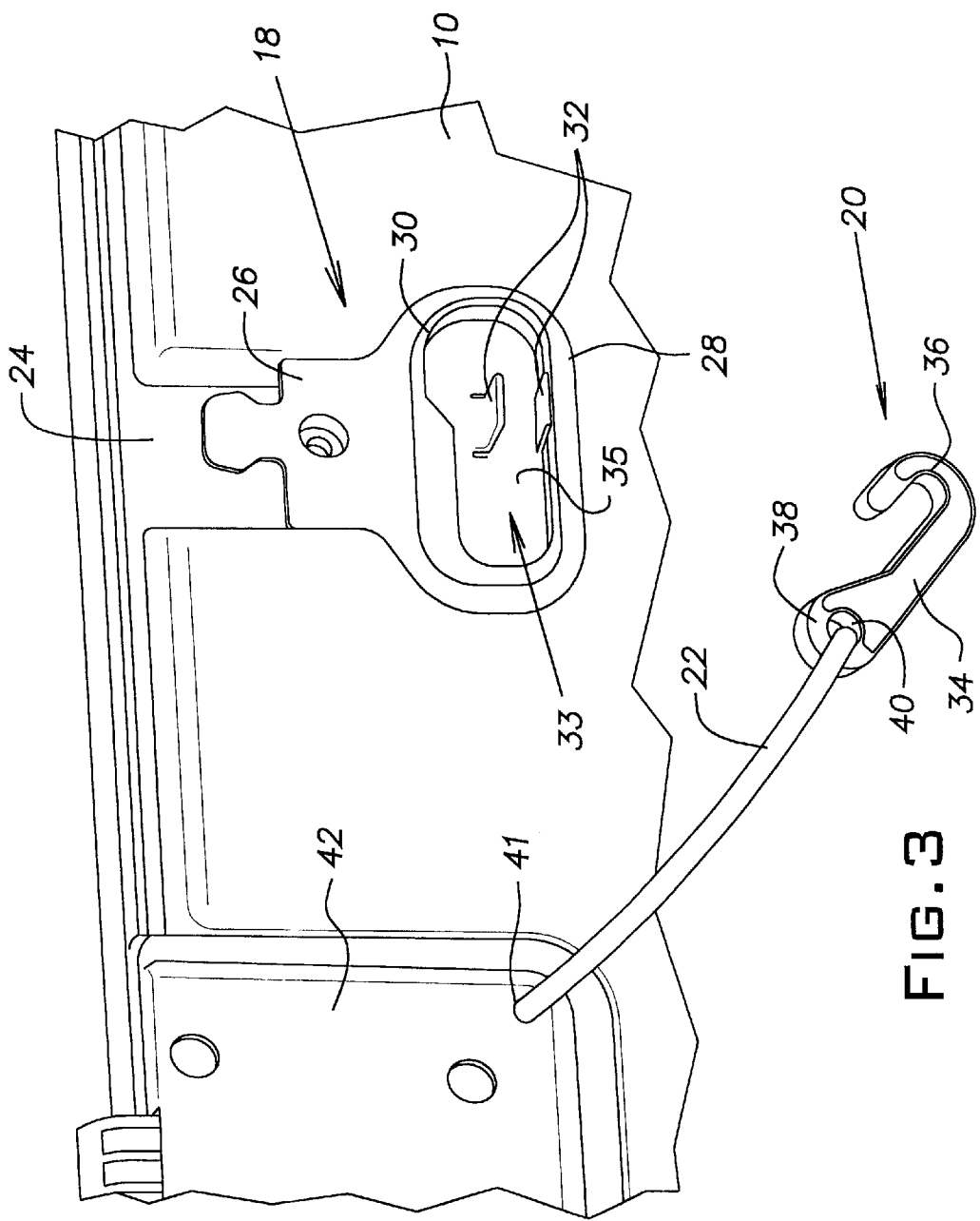

With reference to FIGS. 2 and 3, the retention device 16 includes a fixed grocery hook 18, a removable hook 20, and a tether 22. As illustrated, the fixed grocery hook 18 is disposed within a recess 24 in the lower surface of the cargo lid 10, and includes an upper hook member 26 and a lower body member 28. The recess 24 in the lower surface of the cargo lid 10 includes a channel portion extending from the edge of the cargo lid 10, and an enlarged, generally bulbous or oval-shaped lower recessed portion.

The lower body member 28, which is affixed to the cargo lid 10 within the enlarged lower recessed portion, has a peripheral shape that generally matches the shape of the lower recessed portion so as to be snugly received therein. The upper hook member 26 is aligned with the channel in the cargo lid 10 and is spaced away from a surface defining the channel to facilitate placement of bags or other articles over the upper hook member 26. The lower body member 28 is generally oval, and includes an upstanding rim 30 that defines a recess or receptacle for receipt of the removable hook 20. As will be apparent from the following description, the upstanding rim 30 assists in properly orienting, positioning, and securely retaining the removable hook 20 within the lower body member 28.

A fastener 32 is provided by the lower body member 28 and surrounded by the upstanding rim 30. The fastener 32 in the preferred and illustrated embodiment is a resilient clip, such as a spring clip, that is integrally formed with the lower body member 28 and includes a pair of arms that extend outwardly from a base surface 35 of the lower member 28 (FIG. 3). Alternatively, the fastener may be a separate clip that is attached to the lower body member 28. The fastener 32 is adapted to releasably or snap-fittingly receive the removable hook 20 such that the removable hook may be securely yet releasably received within the space surrounded by the upstanding rim 30 in the lower body member 28. Essentially, the arms of the resilient fastener 32 elastically deform outwardly when the removable hook 20 is pushed or inserted therebetween. One or both of the fastener arms may include inwardly directed tabs or detents (not shown) to more positively secure the removable hook 20 thereto.

The resilient fastener 32 cooperates with the upstanding rim 30, which surrounds the removable hook 20, to define a receptacle 33 that is operable to receive and retain the hook 20 against vibrational influences during operation of the vehicle. More specifically, the resilient fastener 32 secures the removable hook in one direction (i.e., horizontally when the cargo lid 10 a is in the closed position), while the upstanding rim 30 secures the removable hook in another direction (horizontally laterally or side-to side when the cargo lid 10,is in the closed position). As such, noise created by rattling of the removable hook 20 is prevented during use of the vehicle 8.

The removable hook 20 is generally J-shaped, and includes a substantially straight first portion 34 and a curved or arcuate second portion 36. The first portion 34 includes a first end 38 and a second end, the first end 38 having an opening 40 formed therein that is adapted to receive an end of the tether or rope 22. The second end has the curved or arcuate second portion 36 integrally extending therefrom. The first portion 34 is adapted for releasable securement to the resilient fastener 32 at a location intermediate the first and second ends, as illustrated. The curved second portion 36 is adapted to be secured around an upstanding post of a headrest on an adjacent seat, as schematically illustrated in FIG. 1, and described more fully hereinafter.

The tether 22 has, in addition to the first end secured to the removable hook 20, a second or opposite end secured to a mount 41. In the illustrated and preferred embodiment, a central latch assembly 42 of the cargo lid 10 provides the mount. The first and second ends of the tether 22 may simply be knotted to prevent their unintended removal from the removable hook 20 and the mount 41.

When in the storage position, which will typically be the case when the cargo lid 10 is in the closed position, the removable hook 20 is received in the accommodating receptacle 33 provided by the body member 28 of the fixed grocery hook 18 while the tether 22 extends from the removable hook 20 and connects the removable hook 20 to the mount 41. As noted above, the removable hook 20 is securely received against vibrational forces while in the storage position. When the cargo lid 10 is opened to the position shown in FIG. 1, the removable hook is readily available and accessible to the user. Therefore, if it is desired to hold the cargo lid 10 in the open position, the removable hook 20 may simply be withdrawn or snapped out of the receptacle 33 and the curved or hooked-end of the removable hook is placed around, and thereby removably secured to, the support post of the vertically adjacent headrest (FIG. 1). The tether 22, which, in the illustrated and preferred embodiment is secured to the mount 41 at or near a widthwise midpoint of the cargo lid 10, cooperates with the removable hook 20 to maintain the cargo lid 10 in the open position. As will be apparent, the length of the tether 22 is predetermined and selected such that the cargo lid 10 is retained in the desired vertical orientation, which is preferably generally perpendicular to the vehicle floor.

While the cargo lid 10 is retained in the open, generally vertical position by use of the removable hook 20 and tether 22, items may be placed on the hooks 14, 26 available on the now-rearwardly facing lower surface of the cargo lid 10. The retention device 16 provided by the present invention maintains the cargo lid 10 in the open position during use of the vehicle 8, and prevents the lid 10 from unintentionally closing, as otherwise may occur during normal driving.

While the present invention has been described with particularity herein, the invention is not limited thereto. Rather, it is considered apparent that the present invention is capable of numerous modifications, rearrangements and substitutions of parts without departing from the scope and spirit of the present invention. Accordingly, the scope of the invention is only to be defined by the claims appended hereto.

What is claimed is:

1. A combination support hook and cargo lid retention device, comprising:
   a fixed hook member affixed to a cargo lid;
   a removable hook member releasably secured to said fixed hook member; and,
   a tether, said tether having a first end secured to said removable hook member and a second end secured to said cargo lid;
   wherein the fixed hook member defines a receptacle that is adapted to releasably receive said removable hook member such that said removable hook member may be stored on said fixed hook member and may be released from said fixed hook member and moved relative to said fixed hook member for use.

2. The cargo lid retention device according to claim 1, wherein said fixed hook member includes an upper hook member and a lower body member, said lower body member defines the receptacle that is adapted to releasably receive said removable hook member.

3. The cargo lid retention device according to claim 2, further comprising a fastener that is affixed to said lower body member, said fastener being adapted to releasably secure the removable hook member to said fixed hook member.

4. The cargo lid retention device according to claim 3, wherein said lower body member includes an upstanding rim that surrounds said fastener and said removable hook member, said fastener and said rim cooperating to securely retain said removable hook member against movement in at least two directions.

5. The cargo lid retention device according to claim 4, wherein said fastener is a resilient member comprising first and second outstanding arms, said arms being elastically deformable to permit insertion of said removable hook member therebetween.

6. The cargo lid retention device according to claim 5, wherein said removable hook member includes a substantially straight first portion and a curved second portion, said first portion including first and second ends, said first end having a hole formed therein through which the tether extends and said second end being integrally connected to said curved second portion, said first portion being adapted for releasable securement to said fastener.

7. The cargo lid retention device according to claim 6, wherein said tether has a first end secured to the removable hook member and a second, opposite end secured to a mount disposed on the cargo lid.

8. The cargo lid retention device according to claim 7, wherein, when said removable hook member is secured to a remote support, said removable hook member cooperates with said tether to retain the cargo lid in an open position.

9. A cargo lid assembly comprising:
   a cargo lid that is movable between a closed position and an open position; and,
   a retention device secured to said cargo lid, said retention device comprising:
      a fixed hook member affixed to a cargo lid;
      a removable hook member releasably secured to said fixed hook member; and,
      a tether, said tether having a first end secured to said removable hook member and a second end secured to said cargo lid;
   wherein said fixed hook member defines a receptacle that is adapted to releasably receive said removable hook member such that said removable hook member may be stored on said fixed hook member when said cargo lid is in the closed position and may be removed from said fixed hook member and moved relative to said fixed hook member when said cargo lid is in the open position.

10. The cargo lid assembly according to claim 9, wherein said cargo lid has an upper surface and a lower surface, said lower surface defining a recess in which said fixed hook member is received.

11. The cargo lid assembly according to claim 10, wherein said recess includes an upper channel and a lower enlarged recess portion and wherein said fixed hook member includes an upper hook member and a lower body member, said upper hook member being received within said upper channel in a spaced relationship from the lower surface of said cargo lid while said lower body member is received within said enlarged recess portion, a surface of said lower body member being generally flush with said lower surface of said cargo lid.

12. The cargo lid assembly according to claim 11, further comprising a fastener, said lower body member defining the receptacle that is adapted to receive said removable hook member and said fastener is disposed in said receptacle, said fastener being operable to releasably secure the removable hook member to said fixed hook member.

13. The cargo lid assembly according to claim 12, wherein said lower body member includes an upstanding rim that surrounds said fastener and said removable hook member, said fastener and said rim cooperating to securely retain said removable hook member against movement in at least two directions.

14. The cargo lid retention device according to claim 13, wherein said fastener is a resilient member comprising first and second outstanding arms, said arms being elastically deformable to permit insertion of said removable hook member therebetween.

15. The cargo lid according to claim 14, wherein said removable hook member includes a substantially straight first portion and a curved second portion, said first portion including first and second ends, said first end having a hole formed therein through which the first end of the tether extends and said second end being integrally connected to said curved second portion, said first portion being adapted for releasable securement to said fastener.

16. The retention device according to claim 15, wherein, when said removable hook member is secured to a remote support, said removable hook member cooperates with said tether to retain the cargo lid in an open position.

17. A method for retaining a cargo lid in an open position, said cargo lid having an upper surface and a lower surface, said lower surface having a retention device secured thereto, said retention device including a fixed hook member, a removable hook member that is releasably received in said fixed hook member, and a tether for securing, the removable hook member to said cargo lid, the method comprising the steps of:
   moving said cargo lid from a closed position to an open position;
   removing said removable hook member from said fixed hook member; and,
   hooking said removable hook member around a remote support, wherein said tether cooperates with said removable hook member to retain said cargo lid in the open position.

18. The method according to claim 17, wherein said fixed hook member includes a receptacle that receives said removable hook member, wherein said step of removing said removable hook member from said fixed hook member includes the step of pulling said removable hook member away from said fixed hook member.

* * * * *